(12) United States Patent
Kim

(10) Patent No.: US 10,262,772 B2
(45) Date of Patent: Apr. 16, 2019

(54) FILLER AND MULTICORE CABLE HAVING SAME

(71) Applicant: LS CABLE & SYSTEM LTD., Anyang-si, Gyeonggi-do (KR)

(72) Inventor: Kyoung Soo Kim, Bucheon-si (KR)

(73) Assignee: LS CABLE & SYSTEM LTD., Anyang-si, Gyeonggi-Do (KR)

( * ) Notice: Subject to any disclaimer, the term of this patent is extended or adjusted under 35 U.S.C. 154(b) by 0 days.

(21) Appl. No.: 15/756,790

(22) PCT Filed: Aug. 19, 2016

(86) PCT No.: PCT/KR2016/009203
§ 371 (c)(1),
(2) Date: Mar. 1, 2018

(87) PCT Pub. No.: WO2017/043780
PCT Pub. Date: Mar. 16, 2017

(65) Prior Publication Data
US 2018/0268961 A1    Sep. 20, 2018

(30) Foreign Application Priority Data

Sep. 8, 2015  (KR) .......................... 10-2015-0127155

(51) Int. Cl.
*H01B 7/00*    (2006.01)
*H01B 7/24*    (2006.01)
(Continued)

(52) U.S. Cl.
CPC ................. *H01B 7/24* (2013.01); *H01B 7/14* (2013.01); *H01B 7/18* (2013.01); *H01B 7/1875* (2013.01);
(Continued)

(58) Field of Classification Search
CPC ... H01B 7/02; H01B 7/04; H01B 9/02; H01B 9/04; H01B 11/02; H01B 11/04
(Continued)

(56) References Cited

U.S. PATENT DOCUMENTS 5,813,106 A * 9/1998 Haug ...................... D07B 1/12
                                                      29/429
6,046,404 A * 4/2000 Figenschou ............. E21B 17/01
                                                      138/111
(Continued)

FOREIGN PATENT DOCUMENTS

| JP | 2007073519 A | 3/2007 | |
|---|---|---|---|
| WO | 2014202141 A1 | 12/2014 | |
| WO | WO2014/020141 A * | 12/2014 | ............... G02B 6/44 |
| WO | 2015110182 A1 | 7/2015 | |

OTHER PUBLICATIONS

International Search Report related International Application No. PCT/KR2016/009203; report dated Dec. 13, 2016; (5 pages).

*Primary Examiner* — William H. Mayo, III
(74) *Attorney, Agent, or Firm* — K&L Gates LLP

(57) ABSTRACT

A filler and a multicore cable includes a plurality of core portions, which includes a conductor, and a protective layer that surrounds the core portions, the filler being provided between the core portions and the protective layer of the multicore cable, the filler being characterized by including: frame portions including a first frame portion and a second frame portion, which are rotated by predetermined angles towards both sides about the center portion thereof and then incised; and a support portion provided between the frame portions so as to connect the frame portions to each other.

14 Claims, 4 Drawing Sheets

(51) Int. Cl.
*H01B 13/22* (2006.01)
*H01B 13/32* (2006.01)
*H01B 7/18* (2006.01)
*H01B 9/04* (2006.01)
*H01B 7/14* (2006.01)
*H01B 9/00* (2006.01)
*H01B 9/02* (2006.01)
*H01B 13/24* (2006.01)
*H01B 7/28* (2006.01)

(52) U.S. Cl.
CPC ............. *H01B 9/005* (2013.01); *H01B 9/027* (2013.01); *H01B 9/04* (2013.01); *H01B 13/22* (2013.01); *H01B 13/245* (2013.01); *H01B 13/32* (2013.01); *H01B 7/2806* (2013.01); *H01B 7/2813* (2013.01)

(58) Field of Classification Search
USPC ..... 174/102 R, 103, 106 R, 108, 109, 110 R, 174/115, 116
See application file for complete search history.

(56) References Cited

U.S. PATENT DOCUMENTS

| | | | | |
|---|---|---|---|---|
| 6,612,370 | B1* | 9/2003 | Jahnsen | E21B 17/01 166/367 |
| 6,940,054 | B1* | 9/2005 | Heggdal | F16L 9/19 219/629 |
| 7,473,844 | B2* | 1/2009 | Figenschou | E21B 17/203 174/110 R |
| 8,426,733 | B1* | 4/2013 | Cunningham | H02G 3/32 174/112 |
| 2004/0076386 | A1 | 4/2004 | Nechitailo | |
| 2010/0012342 | A1* | 1/2010 | Figenschou | F16L 11/088 174/47 |
| 2010/0054677 | A1* | 3/2010 | Figenschou | H01B 7/045 385/101 |
| 2010/0122844 | A1 | 5/2010 | Erfaimsson et al. | |
| 2015/0144394 | A1* | 5/2015 | Webb | H02G 1/14 174/658 |

* cited by examiner

FILLER AND MULTICORE CABLE HAVING SAME

CROSS-REFERENCE TO RELATED APPLICATIONS

The present application is a National Stage of International Application No. PCT/KR2016/009203, filed Aug. 19, 2016, which claims priority to Korean Application No. 10-2015-0127155, filed Sep. 8, 2015, the disclosures of which are incorporated herein by reference.

TECHNICAL FIELD

The present invention relates to a filler and a multicore cable having the same.

BACKGROUND ART

In a multicore cable with a plurality of power line units each having a conductor to transmit power (hereinafter referred to as 'core parts'), the core parts are arranged to be almost symmetric with respect to a center portion of the multicore cable and a protective layer is provided along outer surfaces of the core parts.

However, since the multicore cable includes the core parts, the roundness of the multicore cable may be difficult to maintain. In particular, when the multicore cable is installed or is wound about a turntable to install it under the sea, an external force such as lateral pressure may be applied thereto and thus the core parts included in the multicore part may be damaged. Thus, a filler is necessary to maintain the roundness of the multicore cable and protect the core parts included in the multicore part when the multicore cable is installed or when an external force such as lateral pressure is applied to the multicore part.

Recently, there is a growing need for an optical communication system based on an optical cable with optical fibers having high bandwidth characteristics than those of an existing copper communication line. Thus, generally, power cables for power transmission are manufactured in the form of a composite cable with optical units having optical fibers to simultaneously transmit power and information.

An optical cable with optical fibers is more advantageous than an existing copper line in terms of low loss characteristics, transmission characteristics such as a high bandwidth, etc., but has lower mechanical strength than a copper line and is thus a transmission medium having low mechanical reliability. Actually, a failure (disconnection, bending, or the like) may occur due to mechanical vulnerability of the optical fiber and various internal/external causes.

Accordingly, when the filler is provided, not only the above-described function but also a function of accommodating and protecting the optical unit are needed.

DETAILED DESCRIPTION OF THE INVENTION

Technical Problem

To address the above-described problem, the present invention is directed to a filler for maintaining the roundness of a multicore cable having a plurality of core parts.

The present invention is also directed to a filler for accommodating and protecting an optical unit when a multicore cable is manufactured in the form of a composite cable having the optical unit.

The present invention is also directed to a filler for preventing damage to core parts and an optical unit included in a multicore cable when the multicore cable is installed or when an external force such as lateral pressure is applied to the multicore cable.

Technical Solution

According to an aspect of the present invention, there is provided a filler which is disposed between a core part and a protective layer of a multicore cable having a plurality of the core parts and the protective layer surrounding the plurality of core parts, wherein each the core part comprises a conductor, an inner semiconducting layer, an insulating layer, an outer semiconducting layer, a metal sheath and a polymeric sheath, the filler comprising: a frame part including a first frame part and a second frame part which are symmetric to each other; a rotating part configured to connect the first frame part and the second frame part; and a cut part dividing the frame part into the first frame part and the second frame part, wherein the filler is opened or closed by being rotated by a certain angle about the rotating part, and each of the first frame part and the second frame part comprises: an outer frame part formed in a circular arc shape; an inner frame part; and a support part configured to connect the outer frame part and the inner frame part.

According to another aspect of the present invention, there is provided the filler, further comprising: optical unit accommodating part frames respectively formed at the first frame part and the second frame part; and an optical unit accommodating part configured to be opened or closed as the filler is rotated about the rotating part.

According to other aspect of the present invention, there is provided the filler, wherein the cut part comprises: an upper cut part formed at the outer frame part; and a lower cut part formed at the inner frame part, wherein a length of the lower cut part is equal to or less than half an internal diameter of the optical unit accommodating part.

According to other aspect of the present invention, there is provided The filler of claim 3, wherein a length of the upper cut part is equal to or less than half the internal diameter of the optical unit accommodating part.

According to other aspect of the present invention, there is provided the filler, wherein at least a portion of the support part connects the frame part and the optical unit accommodating part.

According to other aspect of the present invention, there is provided the filler, wherein the support part comprises: a frame support part configured to connect the outer frame part and the inner frame part; and an accommodating part support part configured to connect and support the optical unit accommodating part frames and the frame support part.

According to other aspect of the present invention, there is provided the filler, wherein the accommodating part support part tapers from the frame support part toward the optical unit accommodating part frames.

According to other aspect of the present invention, there is provided the filler, wherein one end of the outer frame part is connected to the optical unit accommodating part and another end thereof is connected to the inner frame part, the frame support part is formed between the one end and the other end of the outer frame part, and a length from a location of the frame support part to the one end is shorter than a length from the location of the frame support part to the other end.

According to other aspect of the present invention, there is provided the filler, wherein one end of the optical unit accommodating part frame is connected to the outer frame part and another end thereof is connected to the inner frame part, the accommodating part support part is formed between the one end and the other end of the optical unit accommodating part frame, and a length from a location of the accommodating part support part to the one end is shorter than a length from the location of the accommodating part support part to the other end.

According to other aspect of the present invention, there is provided a multicore cable which includes a plurality of core parts, a protective layer surrounding the plurality of core parts and a filler disposed between the core part and the protective layer, wherein each the core part comprises a conductor, an inner semiconducting layer, an insulating layer, an outer semiconducting layer, a metal sheath and a polymeric sheath, the filler comprising: a frame part including a first frame part and a second frame part which are symmetric to each other; a rotating part configured to connect the first frame part and the second frame part; and a cut part dividing the frame part into the first frame part and the second frame part, wherein the filler is opened or closed by being rotated by a certain angle about the rotating part, and each of the first frame part and the second frame part comprises: an outer frame part formed in a circular arc shape, and facing the protective layer; an inner frame part facing the core part; and a support part configured to connect the outer frame part and the inner frame part.

According to other aspect of the present invention, there is provided the multicore cable, wherein each of the fillers further comprises: optical unit accommodating part frames respectively formed at the first frame part and the second frame part; and an optical unit accommodating part configured to be opened or closed as the filler is rotated about the rotating part.

According to other aspect of the present invention, there is provided the multicore cable, wherein an optical unit is accommodated in the optical unit accommodating part, and an internal diameter of the optical unit accommodating part is greater than or equal to an external diameter of the optical unit.

According to other aspect of the present invention, there is provided the multicore cable, wherein the cut part comprises: an upper cut part formed at an outer side of the optical unit accommodating part in a radial direction of the multicore cable; and a lower cut part formed at an inner side of the optical unit accommodating part in the radial direction of the multicore cable, wherein a length of the lower cut part is equal to or less than half an external diameter of the optical unit.

According to other aspect of the present invention, there is provided the multicore cable, wherein a length of the upper cut part is equal to or less than half the external diameter of the optical unit.

According to other aspect of the present invention, there is provided the multicore cable, wherein at least a portion of the support part connects the frame part and the optical unit accommodating part.

According to other aspect of the present invention, there is provided the multicore cable, wherein the support part comprises: a frame support part configured to connect and support the outer frame part and the inner frame part; and an accommodating part support part configured to connect and support the optical unit accommodating part frames and the frame support part.

According to other aspect of the present invention, there is provided the multicore cable, wherein the accommodating part support part tapers from the frame support part toward the optical unit accommodating part frames.

According to other aspect of the present invention, there is provided the multicore cable, wherein one end of the outer frame part is connected to the optical unit accommodating part and another end thereof is connected to the inner frame part, the frame support part is formed between the one end and the other end of the outer frame part, and a length from a location of the frame support part to the one end is shorter than a length from the location of the frame support part to the other end.

According to other aspect of the present invention, there is provided the multicore cable, wherein one end of the optical unit accommodating part frame is connected to the outer frame part and another end thereof is connected to the inner frame part, the accommodating part support part is formed between the one end and the other end of the optical unit accommodating part frame, and a length from a location of the accommodating part support part to the one end is shorter than a length from the location of the accommodating part support part to the other end.

Advantageous Effects

According to the present invention, the roundness of a multicore cable with a plurality of core parts can be maintained using a filler provided between the core parts and an external protective layer.

When the multicore cable is manufactured in the form of a composite cable having an optical unit, the filler can accommodate and protect the optical unit.

Furthermore, the core parts and the optical unit included in multicore cable can be prevented from being damaged due to the filler when the multicore cable is installed or when an external force such as lateral pressure is applied to the multicore cable.

BEST MODE

Hereinafter, various embodiments of the present invention will be described in detail. As used herein, the term 'multicore cable' is defined as a cable with a plurality of power line units (hereinafter referred to as 'core parts') each having a conductor, an inner semiconducting layer, an insulating layer, and an outer semiconducting layer and configured to transmit power. First, a structure of a multicore cable which is in the form of an optical fiber and power line composite cable having an optical unit will be described. Next, a filler according to the present invention will be described.

Figure 1:
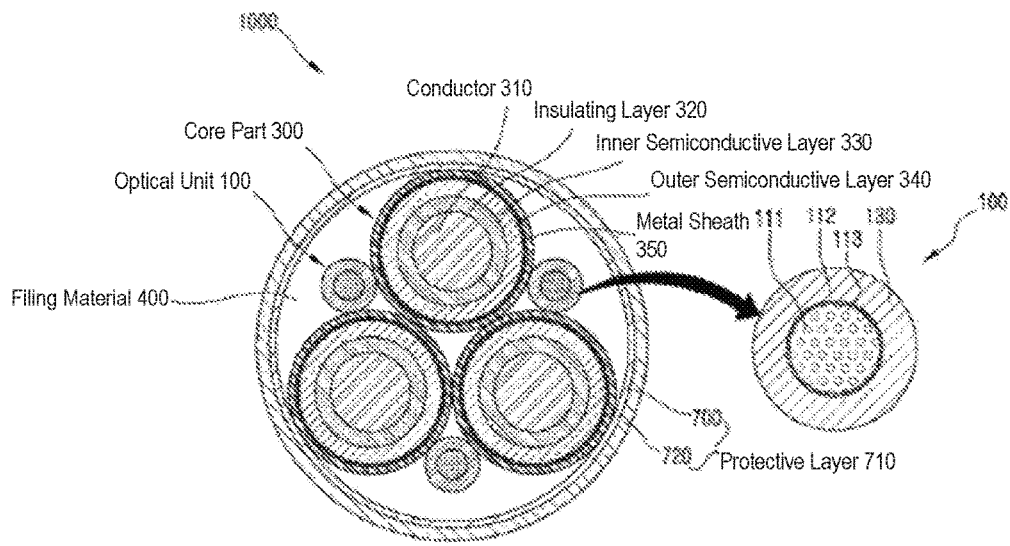
FIG. 1 is a cross-sectional view of a multicore cable in the form of an optical composite cable having an optical fiber unit, according to the related art.

FIG. 1 is a cross-sectional view of a multicore cable 1000 in the form of an optical fiber and power line composite cable with optical units 100, according to the related art.

Although FIG. 1 illustrates the multicore cable 1000 which is a three-phase cable having three core parts 300 as an example, the multicore cable 1000 is not limited thereto and is applicable to all multicore cables having a plurality of core parts.

Each of the core parts 300 includes a conductor 310, an inner semiconducting layer 330, an insulating layer 320, an outer semiconducting layer 340, a metal sheath 350, and a polymeric sheath 360.

The conductor 310 functions as a path through which current flows to transmit power, and may be formed of a material, e.g., copper or aluminum, having high conductivity to minimize power loss and having strength and flexibility appropriate to manufacture and use a cable.

The conductor 310 may be a round compressed conductor compressed into a round shape by twisting a plurality of round wires or may be a flat conductor including a round center wire and a flat wire layer having flat wires twisted to surround the round center wire, and having an overall round cross section. The flat conductor has a relatively high space factor and may thus contribute to decreasing an external diameter of a cable, when compared to the compressed round conductor.

However, since the conductor 310 has a non-flat surface, an electric field may not be uniform and a corona discharge may partially occur. Furthermore, the insulating performance of the conductor 310 may be decreased when a gap occurs between a surface of the conductor 310 and the insulating layer 320 which will be described in detail below.

To address the above-described problems, the inner semiconducting layer 330 may be formed outside the conductor 310. The inner semiconducting layer 330 may be formed by adding conductive particles, such as carbon black, carbon nanotubes, carbon nanoplates, or graphite, to an insulating material and may thus have a semiconducting property.

The inner semiconducting layer 330 prevents a sharp change in an electric field between the conductor 310 and the insulating layer 320 which will be described in detail below, thereby stabilizing insulating performance. The inner semiconducting layer 330 may also suppress a non-uniform charge distribution on a surface of the conductor 310 to uniformize an electric field, and prevent a gap from being formed between the conductor 310 and the insulating layer 320, thereby suppressing the occurrence of a corona discharge, a dielectric breakdown, etc.

The insulating layer 320 is provided on an outermost side of the inner semiconducting layer 330 to electrically insulate the conductor 310 so that electric current may not leak to the outside via the conductor 310. Generally, the insulating layer 320 should have a high breakdown voltage and insulating performance thereof should be maintained for a long time period. Furthermore, the insulating layer 320 should have a low dielectric loss rate and heat resistance performance, e.g., a heat resistance property. Accordingly, the insulating layer 320 may be formed of polyolefin resin such as polyethylene and polypropylene, and preferably, polyethylene resin. Here, the polyethylene resin may be crosslinked resin.

The outer semiconducting layer 340 may be provided outside the insulating layer 320. The outer semiconducting layer 340 is formed of a semiconducting material obtained by adding conductive particles, e.g., carbon black, carbon nanotubes, carbon nanoplates, or graphite, to an insulating material, similar to the inner semiconducting layer 330, and may suppress a non-uniform charge distribution between the insulating layer 320 an the metal sheath 350, thereby stabilizing insulating performance. In addition, the outer semiconducting layer 340 may planarize a surface of the insulating layer 320 to lessen the concentration of an electric field, thereby preventing the occurrence of a corona discharge, and may physically protect the insulating layer 320.

Each of the core parts 300 may additionally include a moisture absorbing part (not shown) to prevent the permeation of moisture into the multicore cable 1000. The moisture absorbing part may be formed between the wires of the conductor 310 and/or on an outer surface of the conductor 310. The moisture absorbing part may be in the form of powder, a tape, a coating layer, or a film containing a super-absorbent polymer (SAP) which quickly absorbs moisture permeating the multicore cable 1000 and is more capable of maintaining a state of absorbing the moisture, and may prevent the permeation of moisture in a lengthwise direction of the multicore cable 1000. The moisture absorbing part may have a semiconducting property to prevent a sharp change in an electric field.

The metal sheath 350 and the polymeric sheath 360 may be additionally provided outside the outer semiconducting layer 340. The metal sheath 350 and the polymeric sheath 360 may protect the core part 300 of the multicore cable 1000 from various environmental causes, e.g., the permeation of moisture, mechanical trauma, abrasion, etc., and fault current which may affect the power transmission performance of the multicore cable 1000.

The metal sheath 350 may be grounded at an end part of the multicore cable 1000, function as a path through which fault current flows when a fault such as a ground fault or a short circuit occurs, protect the multicore cable 1000 from the outside, and block an electric field from being discharged to the outside of the multicore cable 1000.

When a cable is installed in an environment, e.g., at a bottom of a sea, the metal sheath 350 may be formed to seal the core part 300, thereby preventing a decrease in insulating performance, caused by the invasion of foreign substances such as moisture. For example, a cable having seamless and consecutive outer surfaces may be manufactured by extruding a metal fused on outer surfaces of the core parts 300, thereby improving water resistance. The metal may be lead or aluminum. In particular, in the case of a submarine cable, lead having high corrosion resistance to sea water is preferably used, and a metal element-added lead alloy is more preferably used to supplement a mechanical property.

The polymeric sheath 360 formed of resin such as polyvinyl chloride (PVC) or polyethylene may be provided on an outer side of the metal sheath 350 to improve the corrosion resistance, water resistance, etc. of the multicore cable 1000 and protect the multicore cable 1000 from mechanical trauma and other external and environmental causes such as heat, ultraviolet light, etc. In particular, polyethylene resin having high water resistance is preferably used for a power cable installed at a bottom of a sea, and polyvinyl chloride resin is more preferably used in an environment requiring frame resistance.

Furthermore, the core part 300 may further include a woven copper wire tape (not shown) and a moisture absorbing layer (not shown) between the metal sheath 350 and the outer semiconducting layer 340. The woven copper wire tape may include copper wire, a non-woven fabric tape, etc., and be configured to facilitate an electrical contact between the outer semiconducting layer 340 and the metal sheath 218. The moisture absorbing layer may be in the form of powder, a tape, a coating layer, a film, or the like containing SAP which quickly absorbs moisture permeating the multicore cable 1000 and is more capable of maintaining a state of absorbing the moisture. Thus, the moisture absorbing layer may prevent the permeation of moisture in the lengthwise direction of the multicore cable 1000. To prevent a sharp change in an electric field in the moisture absorbing layer, a copper wire may be included in the moisture absorbing layer.

When the multicore cable 1000 is in the form of an optical fiber and power line composite cable, the multicore cable 1000 may further include the optical units 100.

Here, the optical unit 100 may include at least one optical fiber 111 and a tube 112 accommodating the at least one optical fiber 111.

Each of the optical units 100 includes a predetermined number of optical fibers 111 mounted in the tube 112, together with a filling material 113. The tube 112 may be formed of a material having hardness, such as stainless steel. Each of the optical units 100 may further include a sheath 130 covering the tube 112.

The multicore cable 1000 may include various types of protective layer 710 to protect internal components thereof. For example, as illustrated in FIG. 1, the multicore cable 1000 may include a bedding layer 700 covering the core parts 300 and the optical units 100 and formed of polypropylene (PP) yarn or the like, and a jacket 720. The multicore cable 1000 may further include a filling material 400 to protect the core parts 300 and the optical units 100 included in the bedding layer 700. Although not shown, when the multicore cable 1000 is a submarine cable installed to cross a bottom of a sea, the multicore cable 1000 may further include a plurality of armoring iron wires at an outer side of the bedding layer 700 to improve mechanical strength the bedding layer 700.

In the multicore cable 1000 configured as described above, the filling material 400 may be formed of polypropylene yarn. However, when a plurality of yarns are arranged in a core as described above, the yarns may be caught by equipment used to combine the core parts 300, the optical units 100, and the yarns at certain pitches to form the cable. To solve this problem, the combining of the core parts 300, the optical units 100, and the yarns is performed by decreasing the number of yarns to be inserted into the cable but a region of the cable may be distorted due to pressure applied during formation of a protective layer and thus a whole cross section of the cable may not be round. As described above, when the cross section of the cable is not round, a load of the cable wound along a turntable after the production of the cable is not uniformly dispersed. Thus, the cable is likely to be broken during storage or transfer thereof, and a tensile force applied when the cable is bent during installation of the cable is not uniformly applied to all cross sections of the cable. Such a phenomenon will be a cause for damage to a portion of the cable to which a higher tensile force is applied when the cable is used for a long period time. Furthermore, in the case of an optical fiber and power line composite cable including the optical units 100, the optical units 100 are likely to be damaged when an external force is applied to the cable.

Accordingly, the core parts 300 and the optical units 100 of the multicore cable 1000 should be prevented from being damaged or broken by uniformly dispersing bending stress, installation tension, or a tensile force to be applied to the multicore cable 1000 the during installation of the multicore cable 1000 while maintaining the roundness of the multicore cable 1000.

Figure 2:
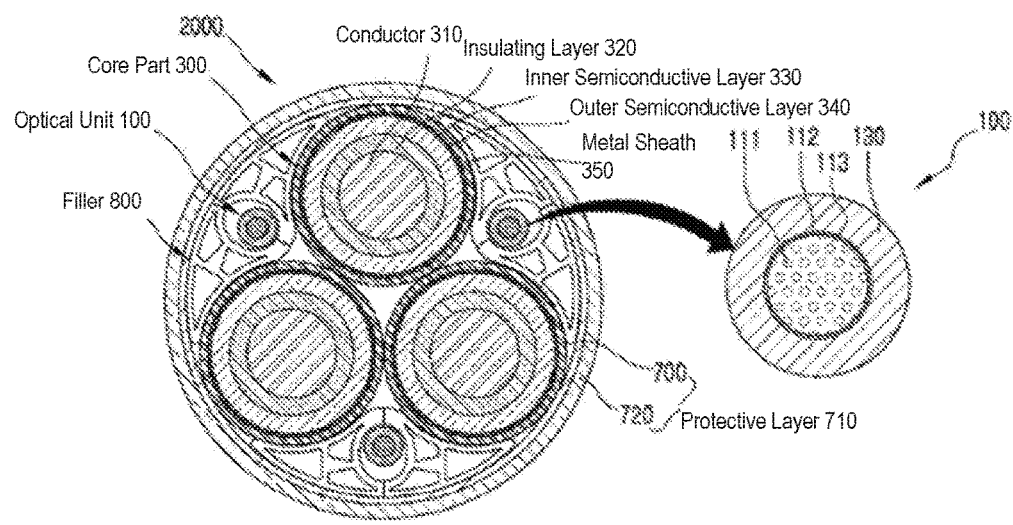
FIG. 2 is a cross-sectional view of a multicore cable having a filler according to an embodiment of the present invention.
Figure 3:
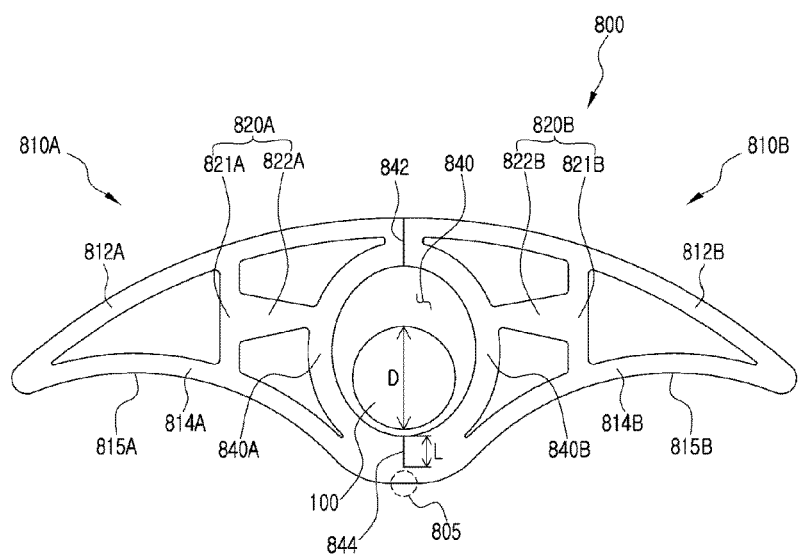
FIG. 3 is a front view of a filler according to an embodiment of the present invention.
Figure 4:
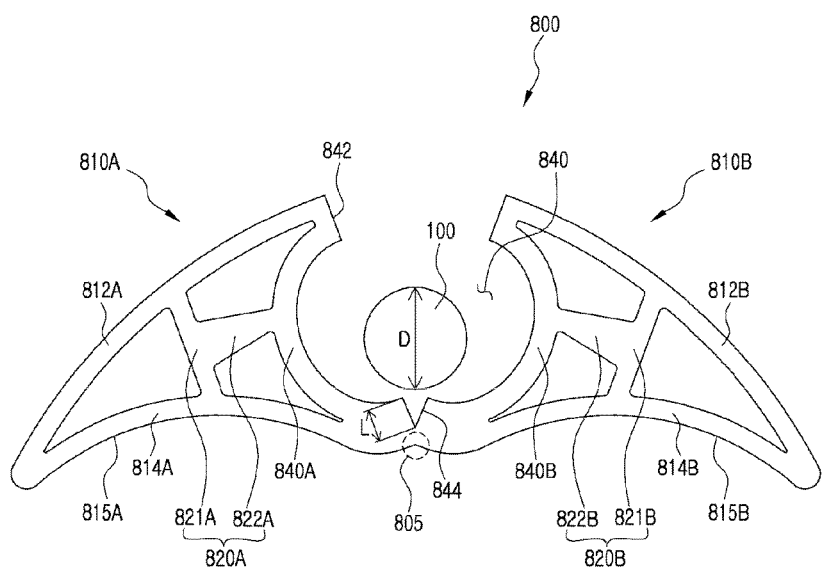
FIG. 4 is a front view illustrating a state in which the filler of FIG. 3 is rotated and cut.

FIGS. 2 to 4 are cross-sectional views illustrating the structures of fillers 800 and a multicore cable 2000 including the same, according to an embodiment of the present invention. The same reference numerals are allocated to components of FIG. 2 that are the same as those of FIG. 1. The multicore cable 2000 is different from the multicore cable 1000 of FIG. 1 in terms of the fillers 800, and will be described below while focusing on the differences from the multicore cable 1000.

Referring to FIG. 2, in the multicore cable 2000 with a plurality of core parts 300, each of the fillers 800 may be provided between one of the core parts 300 and the protective layer 710. The fillers 800 may maintain the roundness of the multicore cable 2000, and accommodate and protect optical units 100 when the multicore cable 2000 is in the form of an optical fiber and power line composite cable having the optical units 100. Furthermore, when the multicore cable 2000 is installed or when an external force such as lateral pressure is applied to the multicore cable 2000, the fillers 800 may prevent damage to the core parts 300 and the optical units 100 included in the fillers 800.

A structure of the fillers 800 will be described in detail below.

FIGS. 3 and 4 are front views illustrating states in which a filler 800 according to an embodiment of the present invention is rotated to be closed or opened.

Referring to FIGS. 3 and 4, the filler 800 includes a frame part 810 having a first frame part 810A and a second frame part 810B which are symmetrical with each other, a rotating part 805 connecting the first frame part 810A and the second frame part 810B, cut parts 842 and 844 dividing the frame part 810 into the first frame part 810A and the second frame part 810B; and is opened or closed by being rotated by a predetermined angle with respect to the rotating part 805. The first frame part 810A and the second frame part 810B may be each formed in a circular arc shape, and may include outer frame parts 812A and 812B facing the protective layer 710, inner frame parts 814A and 814B facing the core part 300, and support parts 820A and 820B connecting the outer frame parts 812A and 812B and the inner frame parts 814A and 814B.

In detail, the frame part 810 includes an outer frame part 812 having a circular arc shape corresponding to a predetermined radius to maintain the roundness of the multicore cable 2000, and an inner frame part 814 including a core part accommodating part 815 configured to accommodate at least a portion of an outer circumference of the core part 300. The frame part 810 is divided into the first frame part 810A and the second frame part 810B by the upper cut part 842 of the outer frame part and the lower cut part 844 of the inner frame part 814, and is opened or closed by rotating the first frame part 810A and the second frame part 810B by the predetermined angle with respect to the rotating part 805. Accordingly, in the multicore cable 2000, optical units 100 which will be described below may be formed in the frame part 810.

The outer frame part 812 may be designed to have a circular arc shape corresponding to the predetermined radius so as to maintain the roundness of the multicore cable 2000, and is completely divided by the upper cut part 842 into the first outer frame part 812A of the first frame part 810A and the second outer frame part 812B of the second frame part 810B. One end of the first outer frame part 812A and one end of the second outer frame part 812B may be respectively connected to the first inner frame part 814A and the second inner frame part 814B which will be described in detail below.

In the multicore cable 2000, the inner frame part 814 is formed to face the core parts 300 and includes the core part accommodating part 815 which is in contact with at least a portion of the outer circumference of the core part 300. In this case, at least a portion of the inner frame part 814 is divided by the lower cut part 844 into the first inner frame part 814A of the first frame part 810A and the second inner frame part 814B of the second frame part 810B. The first inner frame part 814A and the second inner frame part 814B may respectively include a first core part accommodating part 815A and a second core part accommodating part 815B configured to accommodate at least a portion of the outer circumference of one of the core parts 300. For example, the core part accommodating part 815 may be designed to have a shape corresponding to an external diameter of the core part 300 so that an external force applied to the multicore cable 2000 may not be concentrated on portions of the core parts 300 but be evenly dispersed.

The rotating part 805 may be formed at a lower end of the inner frame part 814 such that the frame part 810 is rotated to be opened or closed. That is, the rotating part 805 may be formed at an inner side of the inner frame part 814 in a radial direction of the multicore cable 2000. In this case, a portion of the inner frame part 814 is cut by the lower cut part 844 and a non-cut portion thereof may serve as the rotating part 805. Alternatively, the inner frame part 814 may be completely cut by the lower cut part 844 and an additional rotating part (not shown) may be formed.

As illustrated in FIGS. 3 and 4, when the portion of the inner frame part 814 which is not cut by the lower cut part 844 serves as the rotating part 805, the frame part 810 may be manufactured using synthetic resin having a certain degree of elasticity or the like. The first frame part 810A and the second frame part 810B are rotated about the rotating part 805 in opposite directions and the frame part 810 is thus opened when an additional rotation axis for rotating the first frame part 810A and the second frame part 810B is not provided and the portion of the inner frame part 814 serves as a rotating part and applies a certain degree of external force to opposite sides of the first frame part 810A and the second frame part 810B.

As described above, the fillers 800 according to an embodiment of the present invention has a rotatable structure and thus the core parts 300 and the fillers 800 may be easily combined during the manufacture of the multicore cable 2000. That is, when a plurality of opened fillers 800 and a number of core parts 300 corresponding thereto are combined at certain pitches as illustrated in FIG. 4, the fillers 800 are closed by a force forming the core parts 300 at the certain pitches and the core parts 300 are placed at the core part accommodating part 815 as illustrated in FIG. 3. Furthermore, since each of the fillers 800 includes the outer frame part 812 having the circular arc shape, a multicore cable having higher roundness may be manufactured.

The multicore cable 2000 may be an optical fiber and power line composite cable having the optical units 100. In this case, each of the fillers 800 includes the optical unit accommodating part frames 840A and 840B and the optical unit accommodating part 840 formed at inner sides of the optical unit accommodating part frames 840A and 840B and may thus accommodate the optical unit 100 in the optical unit accommodating part 840.

The optical unit accommodating part 840 may be located at a center of an inner side of the frame part 810 and be thus surrounded by the first optical unit accommodating part frame 840A provided at one end of the first frame part 810A and the second optical unit accommodating part frame 840B provided at one end of the second frame part 810B.

When the first frame part 810A and the second frame part 810B are rotated to close the frame part 810, the optical unit accommodating part 840 surrounded by the first optical unit accommodating part frame 840A and the second optical unit accommodating part frame 840B may have a round shape such that the optical unit 100 may be conveniently accommodated. When the optical unit accommodating part 840 has a round shape as described above, the optical unit accommodating part 840 has a diameter greater than or equal to an external diameter of the optical unit 100 and thus the optical unit 100 may be prevented from being damaged due to the optical unit accommodating part frames 840A and 840B. Here, the round shape is merely an example and the optical unit accommodating part 840 may be embodied in various shapes. In this case, a minor axis of the optical unit accommodating part 840 may have a diameter greater than or equal to the external diameter of the optical unit 100.

When the optical unit 100 is accommodated and inserted into the optical unit accommodating part 840 and the first frame part 810A and the second frame part 810B are rotated to open the frame part 810, end parts of the first and second optical unit accommodating part frames 840A and 840B provided at the ends of the first outer frame part 812A and the second outer frame part 812B are separated from each other and thus the optical unit accommodating part 840 is opened. Thus, the optical unit 100 may be inserted into an inner side of the optical unit accommodating part 840.

In detail, when the multicore cable 2000 is manufactured by combining the number of core parts 300 and the number of optical units 100 corresponding to the fillers 800 at the certain pitches, the optical unit 100 is provided between the separated end parts of the first optical unit accommodating part frame 840A and the second optical unit accommodating part frame 840B of the filler 800 with the opened frame part 810 as illustrated in FIG. 4 and is then placed at the optical unit accommodating part 840, and thereafter the filler 800 is closed by a force forming the certain pitches as illustrated in FIG. 3.

In this case, a length L of the lower cut part 844 may be determined to be equal to or less than half an internal diameter of the optical unit accommodating part 840, and preferably, a diameter D of the optical unit 100 accommodated in the optical unit accommodating part 840 (here, L<D/2). This is because, if the length L of the lower cut part 844 is greater than half the diameter D of the optical unit 100, the optical unit 100 accommodated in the optical unit accommodating part 840 may be caught between adjacent lower cut parts 844 when the first frame part 810A and the second frame part 810B are rotated to close the frame part 810.

Similarly, a length of the upper cut part 842 may be determined to be equal to or less than half the internal diameter of the optical unit accommodating part 840, and preferably, half the diameter D of the optical unit 100 (here, L<D/2). Thus, even if the optical unit 100 provided in the optical unit accommodating part 840 is located between end parts of the optical unit accommodating part frames 840A and 840B due to a process error, the optical unit 100 may be prevented from being damaged by being caught between the end parts of the optical unit accommodating part frames 840A and 840B, since the length of the upper cut part 842 is determined to be equal to or less than half the diameter D of the optical unit 100 (here, L<D/2).

Since the first frame part 810A and the second frame part 810B respectively include the first support part 820A and the second support part 820B, the strength of the frame part 810 may be reinforced and an external force applied to the outer frame parts 812A and 812B may be dispersed to other portions of the filler 800.

The support parts 820A and 820B may include a first frame support part 821A and a second frame support part 821B. The outer frame parts 812A and 812B and the inner frame parts 814A and 814B may be connected to each other. The support parts 820A and 820B may further include a first accommodating part support part 822A and a second accommodating part support part 822B configured to connect the frame part 810, the frame support parts 821A and 821B, and the optical unit accommodating part frames 840A and 840B. Thus, at least portions of the support parts 820A and 820B may connect the frame part 810 and the optical unit accommodating part 840.

For example, as illustrated in FIGS. 3 and 4, the first support part 820A may include the first frame support part 821A provided between the outer and inner frame parts 812 and 814 to connect the outer and inner frame parts 812 and 814, and the first accommodating part support part 822A connecting and supporting the first frame support part 821A and the optical unit accommodating part 840.

The first frame support part 821A is provided between the outer frame part 812 and the inner frame part 814 to support the outer frame part 812 and the inner frame part 814, and provides bearing power when lateral pressure is applied to the multicore cable 2000 as described above with reference to FIGS. 2 and 3. Furthermore, the first accommodating part support part 822A is configured to support the optical unit accommodating part 840 and the first frame support part 821A by connecting roughly center portions of the optical unit accommodating part 840 and the first frame support part 821A. The first accommodating part support part 822A is formed to taper from the frame support parts 821A and 821B toward the optical unit accommodating part frames 840A and 840B, and may thus minimize deformation of the optical unit accommodating part 840 to protect the optical unit 100 and prevent the filler 800 from being damaged and broken when lateral pressure or the like is applied the multicore cable 2000.

In the second frame part 810B, the second frame support part 821B and the second accommodating part support part 822B of the second support part 820B are symmetric with respect to the first frame support part 821A and the first accommodating part support part 822A of the first support part 820A. The first frame support part 821A and the first accommodating part support part 822A are substantially the same as the first frame support part 821A and the first accommodating part support part 822A and thus are not redundantly described here.

Figure 5:
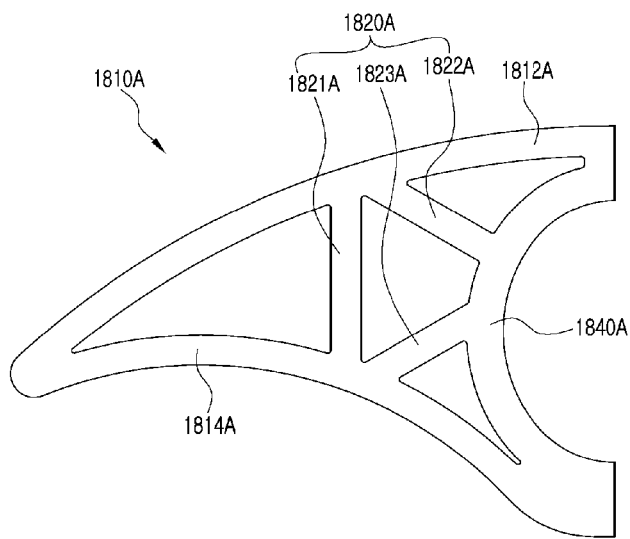
FIGS. 5 and 6 are diagrams illustrating structures of fillers according to various embodiments of the present invention.

FIG. 5 is a diagram illustrating only a first frame part 1810A of the filler 800, according to another embodiment.

Referring to FIG. 5, the first frame part 1810A of the filler 800 according to the present embodiment is substantially the same as that in the previous embodiment, in that the first frame part 1810A includes a first outer frame part 1812A, a first inner frame part 1814A, and a first optical unit accommodating part 1840A but is different from that in the previous embodiment in terms of a structure of a support part at an inner side of the frame part 810.

The first support part 1820A of the first frame part 1810A includes a first frame support part 1821A provided between the first outer frame part 1812A and the first inner frame part 1814A to connect the first outer frame part 1812A and the first inner frame part 1814A, a first accommodating part support part 1822A connecting and supporting the first outer frame part 1812A and the first optical unit accommodating part 1840A, and a second accommodating part support part 1823A connecting and supporting the first inner frame part 1814A and the first optical unit accommodating part 1840A.

The present embodiment is different from the previous embodiment, in that a plurality of accommodating part support parts supporting the first optical unit accommodating part 1840A are directly coupled to the first outer frame part 1812A and the first inner frame part 1814A.

In the present embodiment, the second frame part 810B has a structure symmetrical to that of the first frame part 1810A and is thus not described again here.

Figure 6:
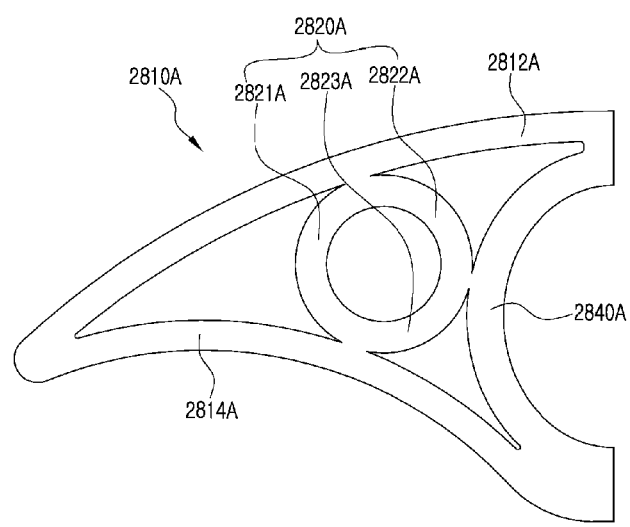

FIG. 6 is a diagram illustrating only a first frame part 1810A of a filler according to another embodiment.

Referring to FIG. 6, a first frame part 2810A of a filler according to the present embodiment is substantially the same as that of the previous embodiment, in that the first frame part 2810A includes a first outer frame part 2812A, a first inner frame part 2814a, a first optical unit accommodating part frame 2840A, and a first support part 2820A but is different from that of the previous embodiment in terms of a shape of a first support part provided at an inner side of the first frame part 2810A.

In the first support part 2820A, each of a first frame support part 2821A, a first accommodating part support part 2822A, and a second accommodating part support part 2823A is formed in a circular arc shape. Thus, an overall shape of the first support part 2820A is round, and the first frame part 2814a and the first optical unit accommodating part 2840A are connected and supported by the first support part 2820A.

In the present embodiment, a second frame part (not shown) has a structure symmetrical to that of the first frame part 2810A and is thus not described again here.

As described above, the filler 800 according to the present invention includes an accommodating part support part to connect the frame part, the frame support part, and the optical unit accommodating part frame. Thus, when lateral pressure or the like is applied to the multicore cable 2000, deformation of the filler 800 may be minimized to protect the optical units 100 and prevent the filler 800 from being damaged and broken.

Figure 7:
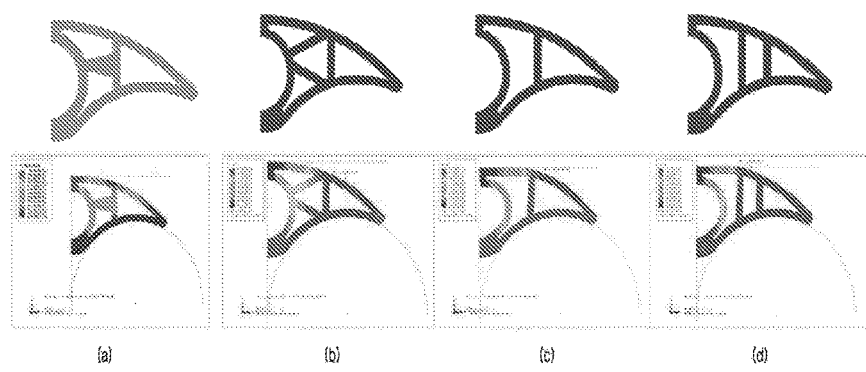
FIG. 7 is a diagram comparing degrees of deflection of fillers according to examples of the present invention with those of fillers according to comparative examples.

FIG. 7 is a diagram comparing degrees of deflection of fillers according to examples of the present invention with those of fillers according to comparative examples when a certain degree of lateral pressure, e.g., 5 ton/m, was applied thereto. In FIG. 7, (a) illustrates the structure of the filler of FIG. 3, and (b) illustrates the structure of the filler of FIG. 5. (c) illustrates comparative example 1 in which a support part does not include an accommodating part support part connected to an optical unit accommodating part and simply includes only a single frame support part. (d) illustrates comparative example 2 in which a support part does not include an accommodating part support part connected to an optical unit accommodating part and simply includes only two frame support parts.

Referring to FIG. 7, degrees of deformation of the fillers according to examples 1 and 2 of the present invention were respectively 0.94 mm and 0.69 mm and thus were very satisfactory. In contrast, degrees of deformation of the fillers according to comparative examples 1 and 2 were respectively 3.13 mm and 2.37 mm and were relatively very high.

Figure 8:
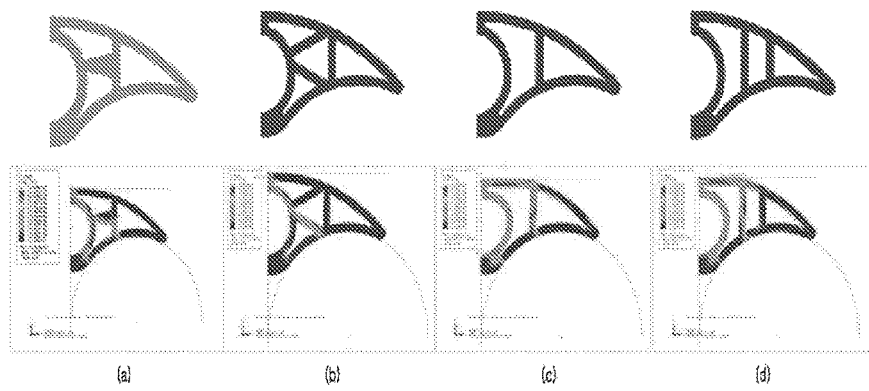
FIG. 8 is a diagram comparing peak stresses of fillers according to examples of the present invention with those of fillers according to comparative examples.

FIG. 8 is a diagram illustrating peak stresses of fillers according to examples of the present invention and those of fillers according to comparative examples when the same lateral pressure as that of FIG. 7 was applied thereto.

Referring to FIG. 8, peak stresses of the fillers according to examples 1 and 2 of the present invention were respectively 34.7 MPa and 38.3 MPa, and peak stresses of the fillers according to comparative examples 1 and 2 were respectively 60.3 MPa and 50.2 MPa. Accordingly, the peak stresses of the fillers of examples 1 and 2 were lower than those of the fillers of comparative examples 1 and 2.

Furthermore, as illustrated in FIGS. 3 and 4, the optical unit accommodating part frames 840A and 840B may be formed at one end of the outer frame part 812A and one end of the outer frame part 812B, other ends of the outer frame parts 812A and 812B may be connected to the inner frame parts 814A and 814B, the frame support parts 821A and 821B may be formed between the one ends and the other ends of the outer frame parts 812A and 812B, and a length to the one ends from the locations of the frame support parts 821A and 821B may be shorter than a length to the other ends from the locations of the frame support parts 821A and 821B.

In addition, one end of the optical unit accommodating part frame 840A and one end of the optical unit accommodating part frame 840B may be connected to the outer frame parts 812A and 812B, other ends of the optical unit accommodating part frames 840A and 840B may be connected to the inner frame part 814, the accommodating part support parts 822A and 822B may be connected between the one ends and the other ends of the optical unit accommodating part frames 840A and 840B, and a length to the one ends from the locations of the accommodating part support parts 822A and 822B may be shorter than a length to the other ends from the locations of the accommodating part support parts 822A and 822B.

In this case, an external force applied to the multicore cable 2000 may be efficiently dispersed to the fillers 800 and thus deformation of the fillers 800 may be minimized, thereby maintaining the roundness of the multicore cable 2000, protecting the optical units 100, and preventing the fillers 800 from being damaged and broken.

The invention claimed is:

1. A filler which is disposed between a core part and a protective layer of a multicore cable having a plurality of the core parts and the protective layer surrounding the plurality of core parts, wherein each core part comprises a conductor, an inner semiconducting layer, an insulating layer, an outer semiconducting layer, a metal sheath and a polymeric sheath,
the filler comprising:
a frame part including a first frame part and a second frame part which are symmetric to each other;
a rotating part configured to connect the first frame part and the second frame part;
a cut part dividing the frame part into the first frame part and the second frame part;
optical unit accommodating part frames respectively formed at the first frame part and the second frame part; and
an optical unit accommodating part configured to be opened or closed as the filler is rotated about the rotating part,
wherein the filler is opened or closed by being rotated by a certain angle about the rotating part,
wherein each of the first frame part and the second frame part comprises:
an outer frame part formed in a circular arc shape;
an inner frame part; and
a support part configured to connect the outer frame part and the inner frame part, and
wherein the cut part comprises:
an upper cut part formed at the outer frame part; and
a lower cut part formed at the inner frame part,
wherein a length of the lower cut part is equal to or less than half an internal diameter of the optical unit accommodating part.

2. The filler of claim 1, wherein a length of the upper cut part is equal to or less than half the internal diameter of the optical unit accommodating part.

3. The filler of claim 1, wherein at least a portion of the support part connects the frame part and the optical unit accommodating part.

4. The filler of claim 3, wherein the support part comprises:
a frame support part configured to connect the outer frame part and the inner frame part; and
an accommodating part support part configured to connect and support the optical unit accommodating part frames and the frame support part.

5. The filler of claim 4, wherein the accommodating part support part tapers from the frame support part toward the optical unit accommodating part frames.

6. The filler of claim 5, wherein one end of the outer frame part is connected to the optical unit accommodating part and another end thereof is connected to the inner frame part,
the frame support part is formed between the one end and the other end of the outer frame part, and
a length from a location of the frame support part to the one end is shorter than a length from the location of the frame support part to the other end.

7. The filler of claim 6, wherein one end of the optical unit accommodating part frame is connected to the outer frame part and another end thereof is connected to the inner frame part,
the accommodating part support part is formed between the one end and the other end of the optical unit accommodating part frame, and
a length from a location of the accommodating part support part to the one end is shorter than a length from the location of the accommodating part support part to the other end.

8. A multicore cable which includes a plurality of core parts, a protective layer surrounding the plurality of core parts and a filler disposed between the core part and the protective layer, wherein each the core part comprises a conductor, an inner semiconducting layer, an insulating layer, an outer semiconducting layer, a metal sheath and a polymeric sheath,
the filler comprising:
a frame part including a first frame part and a second frame part which are symmetric to each other;
a rotating part configured to connect the first frame part and the second frame part;
a cut part dividing the frame part into the first frame part and the second frame part;
optical unit accommodating part frames respectively formed at the first frame part and the second frame part; and
an optical unit accommodating part configured to be opened or closed as the filler is rotated about the rotating part,
wherein the filler is opened or closed by being rotated by a certain angle about the rotating part,
wherein each of the first frame part and the second frame part comprises:

an outer frame part formed in a circular arc shape, and facing the protective layer;

an inner frame part facing the core part; and a support part configured to connect the outer frame part and the inner frame part, wherein an optical unit is accommodated in the optical unit accommodating part, and an internal diameter of the optical unit accommodating part is greater than or equal to an external diameter of the optical unit, wherein the cut part comprises:

an upper cut part formed at the outer frame part; and a lower cut part formed at the inner frame part, and wherein a length of the lower cut part is equal to or less than half an internal diameter of the optical unit accommodating part.

9. The multicore cable of claim 8, wherein a length of the upper cut part is equal to or less than half the external diameter of the optical unit.

10. The multicore cable of claim 8, wherein at least a portion of the support part connects the frame part and the optical unit accommodating part.

11. The multicore cable of claim 10, wherein the support part comprises:

a frame support part configured to connect and support the outer frame part and the inner frame part; and an accommodating part support part configured to connect and support the optical unit accommodating part frames and the frame support part.

12. The multicore cable of claim 11, wherein the accommodating part support part tapers from the frame support part toward the optical unit accommodating part frames.

13. The multicore cable of claim 12, wherein one end of the outer frame part is connected to the optical unit accommodating part and another end thereof is connected to the inner frame part, the frame support part is formed between the one end and the other end of the outer frame part, and a length from a location of the frame support part to the one end is shorter than a length from the location of the frame support part to the other end.

14. The multicore cable of claim 13, wherein one end of the optical unit accommodating part frame is connected to the outer frame part and another end thereof is connected to the inner frame part, the accommodating part support part is formed between the one end and the other end of the optical unit accommodating part frame, and a length from a location of the accommodating part support part to the one end is shorter than a length from the location of the accommodating part support part to the other end.

* * * * *